US006600501B1

(12) United States Patent (10) Patent No.: US 6,600,501 B1
Israel et al. (45) Date of Patent: Jul. 29, 2003

(54) METHOD AND SYSTEM FOR GENERATING A DYNAMIC TIMELINE

(75) Inventors: Larry J. Israel, Bellevue, WA (US); James H. Cox, Seattle, WA (US); Kipling A. Knox, Sammamish, WA (US); Abdul Wajid "Shammi" Mohamed, Bellevue, WA (US); Adrienne E. O'Donnell, Seattle, WA (US); Lisa Everett Woods, Poway, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/574,459

(22) Filed: May 18, 2000

(51) Int. Cl.⁷ .................................................. G09G 5/00

(52) U.S. Cl. ...................... 345/810; 345/833; 345/838; 345/855; 345/963; 705/9; 715/507; 708/112

(58) Field of Search ................................ 345/963, 810, 345/833, 838, 855; 705/9, 10; 715/501, 507; 707/1–5; 708/112, 110; 368/28, 41

(56) References Cited

U.S. PATENT DOCUMENTS

| 977,974 | A | * | 12/1910 | Showalter | 623/35 |
| 5,109,482 | A | * | 4/1992 | Bohrman | 345/723 |
| 5,241,671 | A | * | 8/1993 | Reed et al. | 707/104.1 |
| 5,874,965 | A | * | 2/1999 | Takai et al. | 345/667 |
| 6,061,062 | A | * | 5/2000 | Venolia | 345/856 |
| 6,085,205 | A | * | 7/2000 | Peairs et al. | 715/530 |
| 6,092,067 | A | * | 7/2000 | Girling et al. | 707/100 |
| 6,144,375 | A | * | 11/2000 | Jain et al. | 715/500.1 |
| 2002/0002558 | A1 | * | 1/2002 | Krause | 707/104.1 |

* cited by examiner

Primary Examiner—Ba Huynh
(74) Attorney, Agent, or Firm—King & Spalding LLP (57) ABSTRACT

A Dynamic Timeline for a computer-based information source, such as an electronic encyclopedia. The Dynamic Timeline can display Links, typically a reference to a time period, topic, or event. When the user chooses the Link, an array of information is presented to the user about the Link-related time period, topic, or event. Links can highlight individual events and trends that occur over a period of time. Links also can present an editorial perspective of events. The Links are typically listed in chronological order on the Dynamic Timeline for an electronic encyclopedia. The Dynamic Timeline allows users to view different Links by changing some dynamic settings.

8 Claims, 11 Drawing Sheets

METHOD AND SYSTEM FOR GENERATING A DYNAMIC TIMELINE

TECHNICAL FIELD

The present invention relates to electronic timelines for data displays. More specifically, the invention relates a Dynamic Timeline that allows users to view different historical information by changing the dynamic setting information.

BACKGROUND OF THE INVENTION

As computer technology has advanced, encyclopedias have been published in electronic form. These electronic encyclopedias make it possible to compile vast amounts of information on a few computer discs. Although electronic encyclopedias have made historical information more accessible and less expensive, many users feel lost in the sea of information that is available in electronic encyclopedias.

In order to make historical information more understandable and useful, some electronic encyclopedias have electronic timeliness. These electronic timelines are typically large, scrollable graphical elements marked with events and time periods. These timelines help users see events in relation to other historical events, and allow users to view historical data in chronological order. These electronic timelines have a simple search interface that allows users to pull up and scroll through a static list of events or dates. For example, a user is able to scroll through the 1900s and see historical events of the 1900s listed on a timeline in chronological order.

Although these electronic timelines are very useful, they lack services that users need because they are static and fixed data structures. Users want to be able to view information that is relevant to their research. Existing electronic timelines lack provisions to allow user selectivity of which events and/or time periods should be shown.

Consequently, there is a need in the art for a timeline that can allow users to select dates and subjects and retrieve related information. Furthermore, users need a method and system that can create customized timelines and compare different historical aspects of a certain time period. Users also need to be able to view different time periods and differing levels of detail on a timeline. A further need in the art exists for a timeline that can display prioritized information. In addition, there is a need to highlight individual events and trends that occur over longer periods of time, present an editorial perspective on events, provide a geographical and prehistory perspective, and provide a textual view of events.

SUMMARY OF THE INVENTION

The present invention satisfies the above-described needs by providing a Dynamic Timeline for a computer-based information source, such as an electronic encyclopedia. The Dynamic Timeline can display Links. Links are a few words in a box that refer to a time period, topic, or event. When the user chooses the Link, he is taken to an array of information about the Link time period, topic, or event. The Links are listed in chronological order on the Dynamic Timeline. The information that is shown on the Dynamic Timeline can be determined by a priority configuration. The Dynamic Timeline allows users to view different Links by changing some dynamic settings.

The present invention is a computer-implemented process for generating a dynamic timeline. It first determines a center year for the selected time period and a pair of boundary years. It next obtains the Links within the boundary years. It then determines the Links that fit in a window frame. Finally, it renders the timeline.

The present invention can have three types of objects: a Data object, a Grid object and a View object. The Data object collects relevant Links and sorts Links by priority. The Grid object can determine how many Links fit on the screen and where they should be painted. The View object gets dynamic setting information and gives it to the Grid object. The View object can include a Main Window, Time Periods, Tools, a Scroll, a Zoom, and a Time Axis. The Main Window can display the Links and a Watermark. The Time Periods include features that enables the user to view information about various time periods, such as a Geologic Timeline, a Prehistory Timeline, 400 B.C., 800, 1600, 1800 and 1950. The Tools can have a Topic or Year feature, a Category and Place feature, and a Compare feature.

The first time the user enters the timeline from an introductory screen, the Main Window can use some default dynamic settings to create a default timeline. Once the default timeline has been created, the present invention can allow the user to change the dynamic settings. The user can change the settings for the Time Periods, the Tools, the Scroll, and the Zoom. Once the dynamic settings are changed, the center year, the boundary years and the relevant Links are identified prior to painting the Links, the Time Axis, and the Watermark on the computer screen.

The present invention also allows a user to view events in the timeline on a list that can be copied and printed. To access this aspect the user can select the View as List from the View object.

DETAILED DESCRIPTION OF EXEMPLARY EMBODIMENTS

The present invention is a Dynamic Timeline for a computer-based information source, such as an electronic encyclopedia. The Dynamic Timeline can display some Links, which are words in a box that refer to a time period, topic, or event. When the user chooses the Link, he is taken to an array of information about the Link. The Links are listed in chronological order on the Dynamic Timeline. The user can view different Links in a Main Window by changing some dynamic settings. The user can change the dynamic settings of the Time Periods, the Tools, the Scroll, and the Zoom. Once the dynamic settings are changed, the center year, the boundary years and the relevant Links are identified prior to painting the Main Window and Time Axis on the computer screen. As an added feature, the user can view the Links on a list that can be copied and printed.

Figure 1:
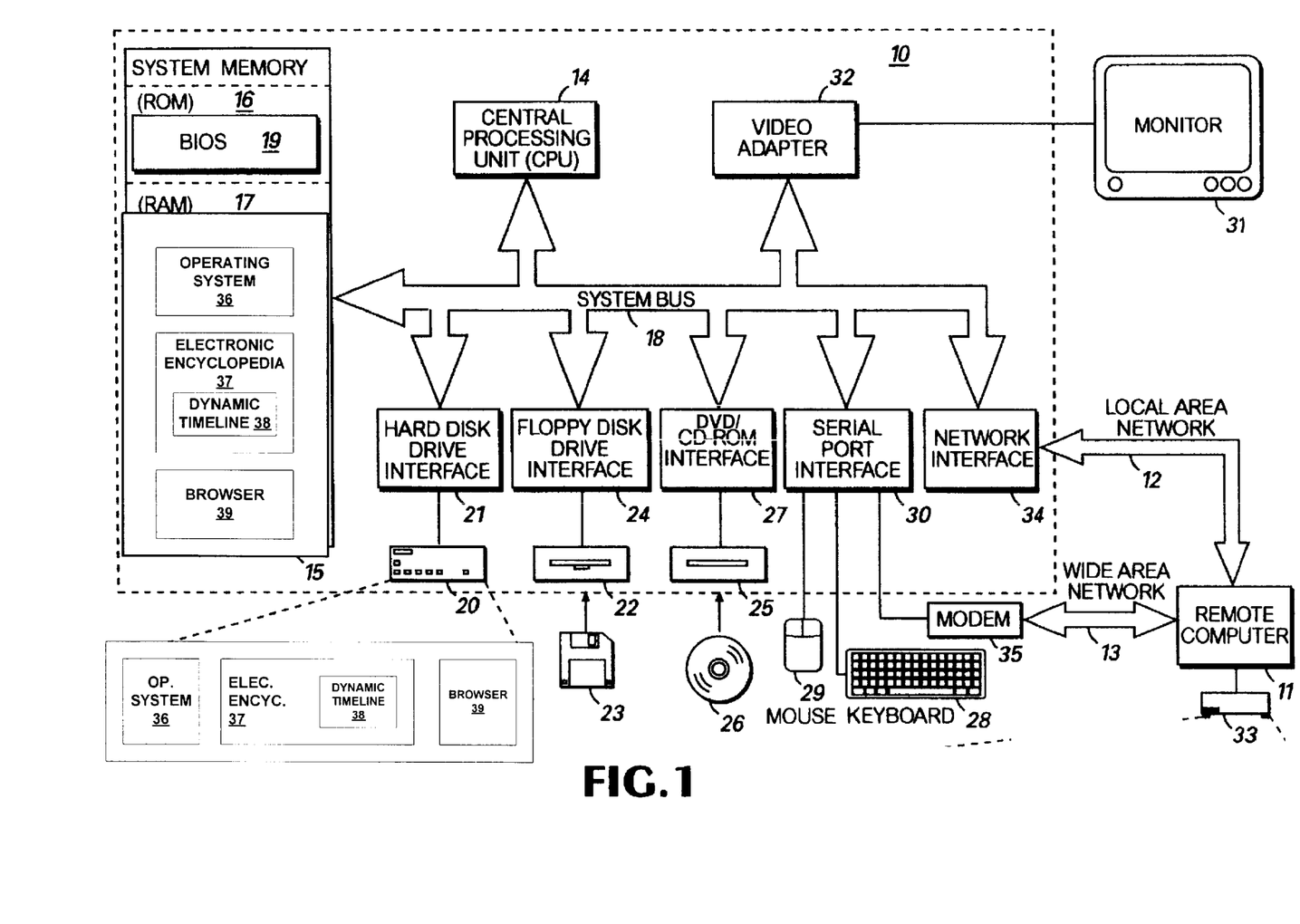
FIG. 1 is a block diagram of a personal computer that provides an exemplary operating environment for an exemplary embodiment of the present invention.
Figure 2:
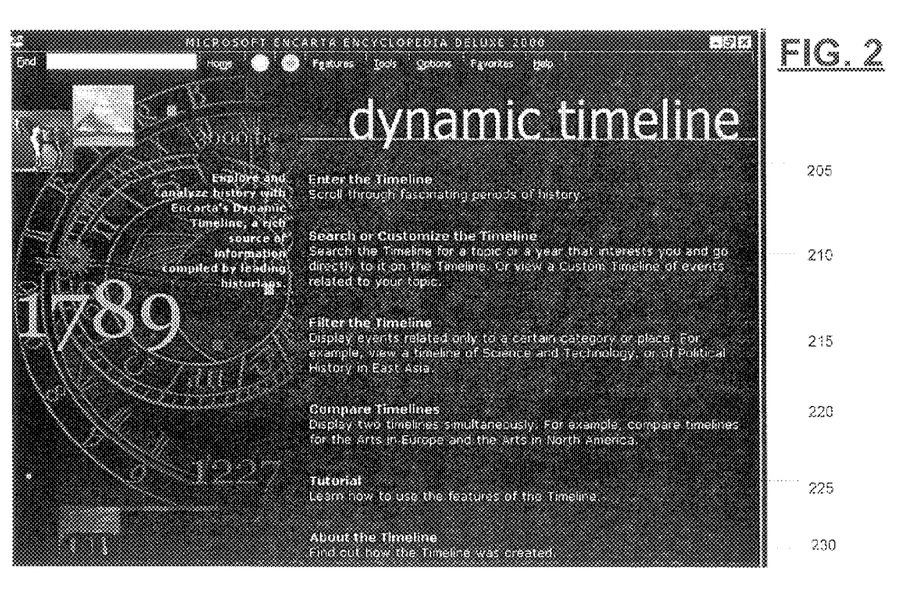
FIG. 2 is a screen display showing the User Interface component for an exemplary embodiment of the present invention.
Figure 3:
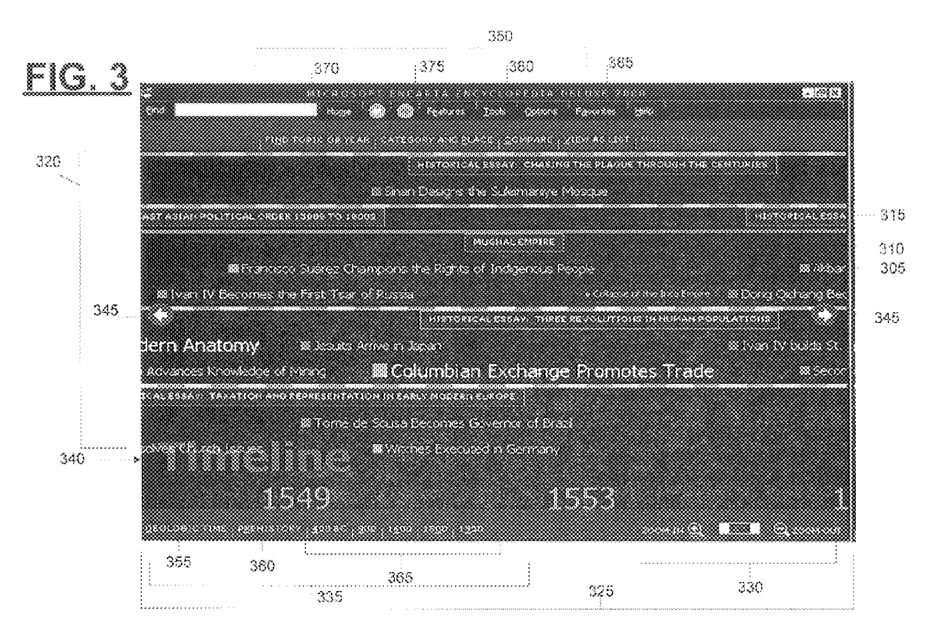
FIG. 3 is a screen display showing a View object for an exemplary embodiment of the present invention.
Figure 4:
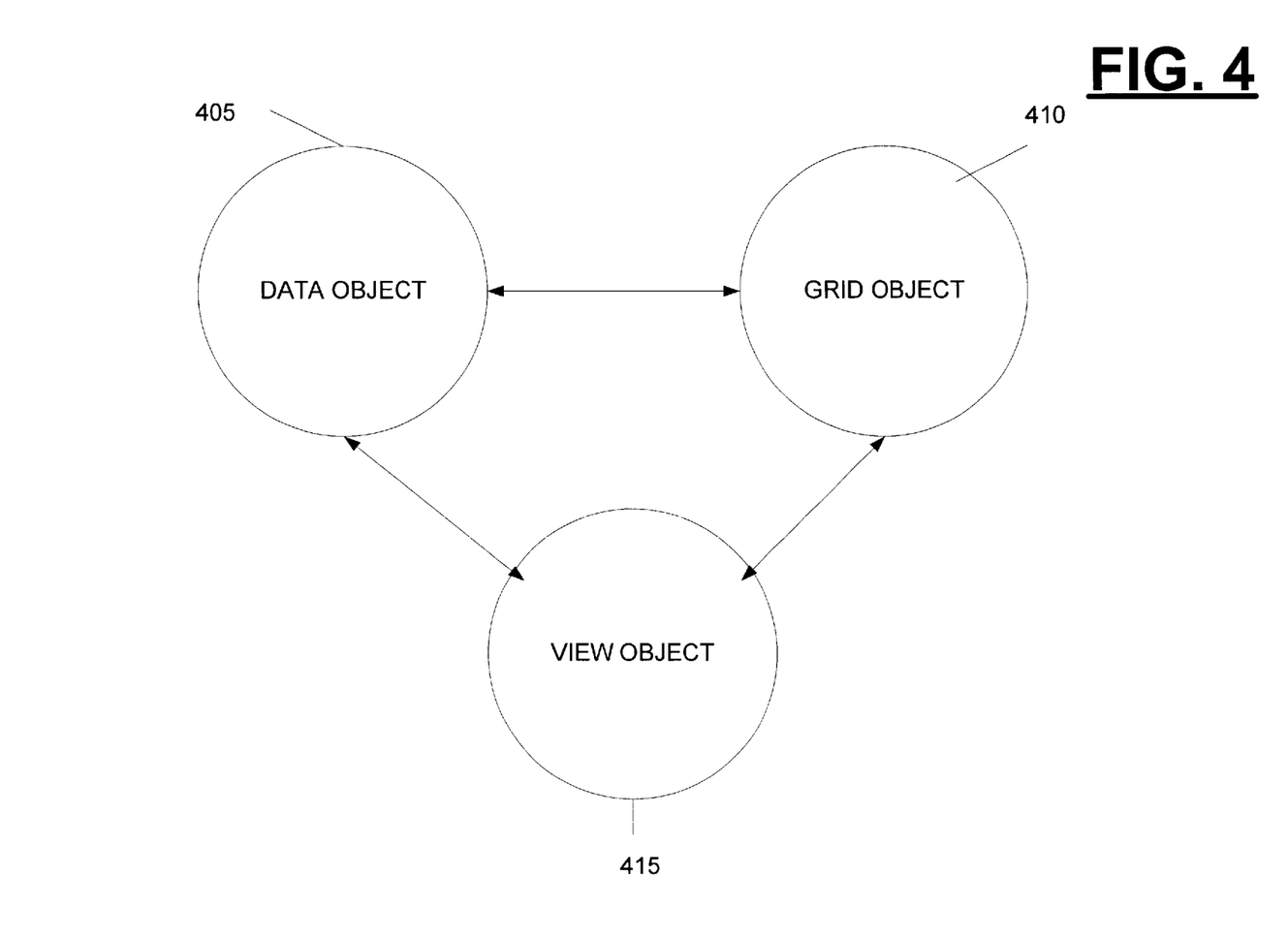
FIG. 4 is a block diagram illustrating internal program objects of an exemplary embodiment which can report actions between a Data object, a Grid object, and the View object.
Figure 5:
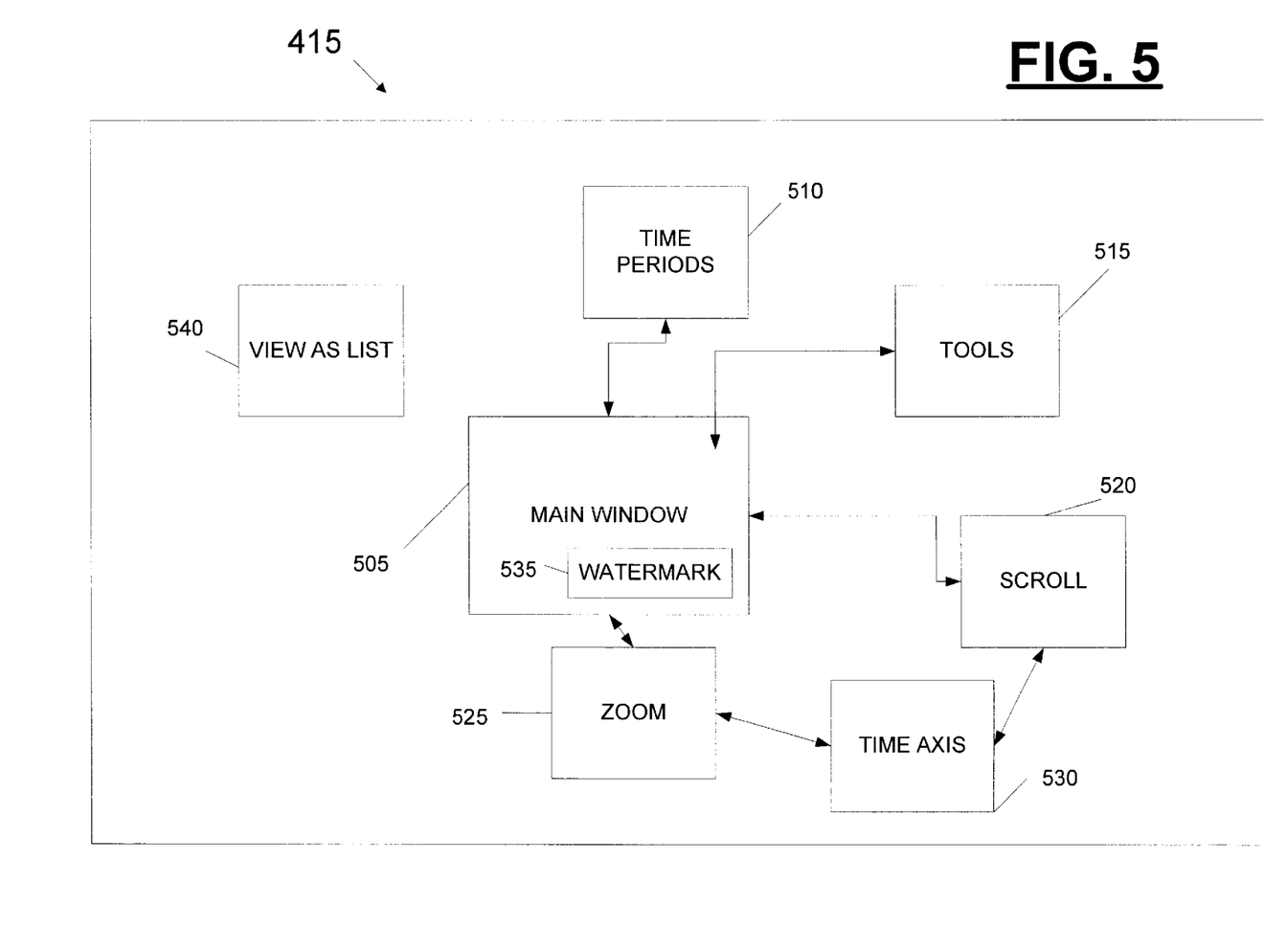
FIG. 5 is a block diagram illustrating exemplary objects of the View object shown in FIG. 4.
Figure 6:
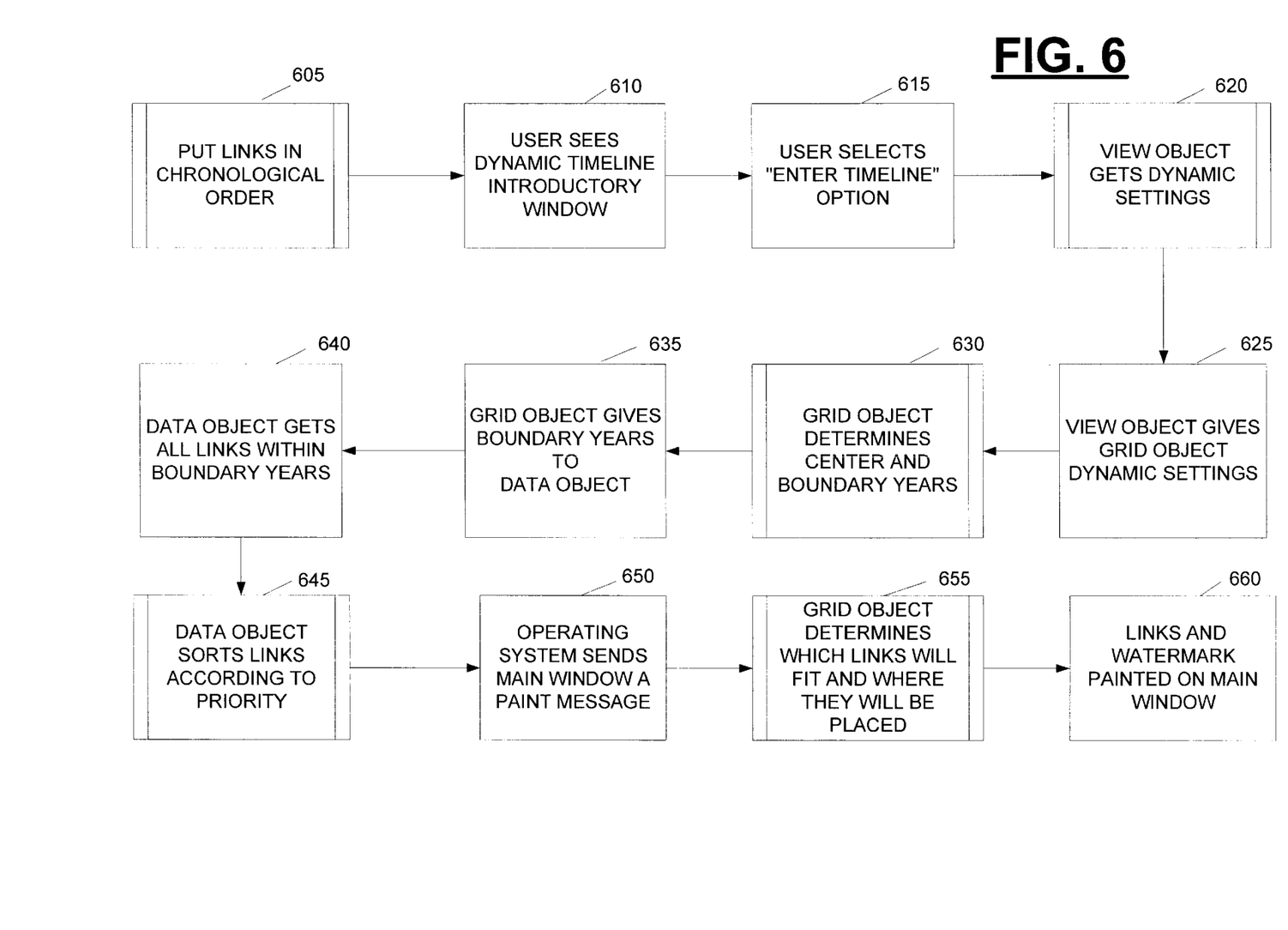
FIG. 6 is flow diagram illustrating an exemplary method for providing a Dynamic Timeline for an electronic encyclopedia with a Time Periods, a Tools, a Scrolling, and a Zooming option.

FIG. 1 is a block diagram of a personal computer that provides an exemplary operating environment. FIGS. 2–3 are screen displays showing the User Interface component for an exemplary embodiment of the present invention. FIGS. 4–5 are block diagrams illustrating internal program objects. FIG. 6 is flow diagram illustrating an exemplary method for providing a Dynamic Timeline with numerous options. FIGS. 7–11 are functional block diagrams illustrating exemplary methods used to determine which information to paint and where it should be painted on a Main Window.

Although the preferred embodiment will be generally described in the context of a program and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including a central processing unit (CPU), memory storage devices for the CPU, display devices, and input devices. Furthermore, these processes and operations may utilize conventional computer components in a heterogeneous distributed computing environment, including remote file servers, remote compute servers, and remote memory storage devices. Each of these conventional distributed computing components is accessible by the CPU via a communications network.

The processes and operations performed by the computer include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, data, objects, properties, flags, types, identifiers, values, elements, symbols, characters, terms, numbers, points, records, images, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as comparing, selecting, viewing, getting, giving, etc. which are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hardwired logic or programs stored in nonvolatile memory, such as read only memory.

Referring now to the drawings, in which like numerals represent like elements throughout the several figures, aspects of the present invention and the preferred operating environment will be described.

The Operating Environment

FIG. 1 illustrates various aspects of an exemplary computing environment in which the present invention is designed to operate. Those skilled in the art will immediately appreciate that FIG. 1 and the associated discussion are intended to provide a brief, general description of the preferred computer hardware and program modules, and that additional information is readily available in the appropriate programming manuals, user's guides, and similar publications.

The Computer Hardware

FIG. 1 illustrates a conventional personal computer 10 suitable for supporting the operation of the preferred embodiment of the present invention. As shown in FIG. 1, the personal computer 10 operates in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or computer server.

The personal computer 10 includes a central processing unit (CPU) 14. The personal computer also includes system memory 15 (including read only memory (ROM) 16 and random access memory (RAM) 17), which is connected to the CPU 14 by a system bus 18. The preferred computer 10 utilizes a BIOS 19, which is stored in ROM 16. Those skilled in the art will recognize that the BIOS 19 is a set of basic routines that helps to transfer information between elements within the personal computer 10. Those skilled in the art will also appreciate that the present invention may be implemented on computers having other architectures, such as computers that do not use a BIOS, and those that utilize other microprocessors, such as the "MIPS" or "POWER PC" families of microprocessors from Silicon Graphics and Motorola, respectively.

Within the personal computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM or DVD drive 25, which is used to read a CD-ROM or DVD disk 26, is connected to the system bus 18 via a CD-ROM or DVD interface 27. A user enters commands and information into the personal computer 10 by using input devices, such as a keyboard 28 and/or pointing device, such as a mouse 29, which are connected to the system bus 18 via a serial port interface 30. Other types of pointing devices (not shown in FIG. 1) include track pads, track balls, pens, head trackers, data gloves and other devices suitable for positioning a cursor on a computer monitor 31. The monitor 31 or other kind of display device is connected to the system bus 18 via a video adapter 32.

The remote computer 11 in this networked environment is connected to a remote memory storage device 33. This remote memory storage device 33 is typically a large capacity device such as a hard disk drive, CD-ROM or DVD drive, magneto-optical drive or the like. The personal computer 10 is connected to the remote computer 11 by a network interface 34, which is used to communicate over the local area network 12.

As shown in FIG. 1, the personal computer 10 is also connected to the remote computer 11 by a modem 35, which is used to communicate over the wide area network 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 10, those of ordinary skill in the art will quickly recognize that the modem 35 may also be internal to the personal computer 11, thus communicating directly via the system bus 18. It is important to note that connection to the remote computer 11 via both the local area network 12 and the wide area network 13 is not required, but merely illustrates alternative methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as an operating system 36 and data are provided to the personal computer 10 via computer-readable media. In the preferred computer, the computer-readable media include the local or remote memory storage devices, which may include the local hard disk drive 20, floppy disk 23, CD-ROM or DVD 26, RAM 17, ROM 16, and the remote memory storage device 33. In the preferred personal computer 10, the local hard disk drive 20 is used to store data and programs, including the operating system and programs.

The Preferred Program

The focus of a Dynamic Timeline 38 is described below in a manner that relates to its use in an electronic encyclopedia 37 of FIG. 1. This description is intended in all respects to be illustrative rather than restrictive. Alternative embodiments will be apparent to those skilled in the art.

The Screen Displays

Turning now to FIGS. 2–11, exemplary embodiments of the present invention are described. FIG. 2 is a screen display showing a User Interface component for an exemplary embodiment of the present invention. One component of the present invention is the ability of the user to access several choices. An Enter Timeline 205 permits the user to access the Dynamic Timeline. A Topic and Year 210 allows the user to search for a specific topic or year on the Dynamic Timeline. A Category or Place 215 or a Compare 220 allows a user to filter events based on category and place or to compare different filters for the same time period. A Tutorial 225 and an About the Timeline 230 permit the user to learn more about the Dynamic Timeline.

FIG. 3 is a screen display showing a View object for an exemplary embodiment of the present invention. The View object can include several components. A Main Window 320 displays Links and a Watermark 340. A Time Periods 335 allows a user to jump to various times on the Dynamic Timeline. A Tools 350 permits the user to filter the Links shown on the Main Window 320. A Scroll 345 allows the user to move forward or backward along the Dynamic Timeline. A Zoom 330 lets the user view differing degrees of detail. A Time Axis 325 puts the reference years on a grid. A View as List 385 allows the user to view Links on the screen as a list.

In the preferred embodiment of the present invention, the Main Window 320 displays three types of Links: Time Period Links 310, Historical Essay Links 315 and Discrete Event Links 305. Links are a few words in a box that refer to a time period, topic, or event. When the user chooses a Link, he is taken to an array of information about the Link time period, topic, or event. Time Period Links 310 highlight individual events and trends that occur over longer periods of time. Historical Essay Links 315 present an editorial perspective of events. Discrete Event Links 305 highlight a single event. Time Periods 335 include features that can take the user to various time periods, such as a Geologic Timeline 355, a Prehistory Timeline 360, or Various Years 365 (such as 400 B.C., 800, 1600, 1800 and 1950). Tools 350 can have a Topic or Year 370, a Category and Place 375, and a Compare 380 option.

Another feature of the View object is the View as List 385 of FIG. 3. This feature allows the user to view the Links as a list that can be copied and printed. This component is useful for the user, as it enables the user to keep a simple record of his activities.

The Internal Objects

FIG. 4 is a block diagram illustrating exemplary internal program objects: a Data object 405, a Grid object 410, and a View object 415. The Data object 405 collects relevant Links and sorts Links by priority. The Grid object 410 determines the center and boundary years that will appear on the User Interface screen. The boundary years include the year that appears on the left and right side of the screen on the Time Axis 325, as shown in FIG. 3. The Grid object 410 also can determine how many Links fit on the screen and where they should be painted. The View object 415 obtains dynamic setting information. The View object 415 also passes dynamic setting information to the Grid object 410. The Grid object 410 gives boundary years to the Data object 405.

FIG. 5 is a block diagram illustrating exemplary objects of the View object 415 of FIG. 4. The View object 415 can include a Main Window 505, Time Periods 510, Tools 515, a Scroll 520, a Zoom 525, a Time Axis 530, a Watermark 535, and a View as List 540. The Main Window 505 displays Links and the Watermark 535. Time Periods 510 allow a user to quickly access various times in history by choosing a Geologic Timeline 355, a Prehistory Timeline 360, or Various Years 365 (such as 400 B.C., 800, 1600, 1800 and 1950). Using the Tools 515 the user is able to filter the Links shown on the screen by Topic or Year 370, Category and Place 375 and Compare 380. Using the Scroll 520, the user is able to navigate through the timeline by scrolling forward or backward on the Time Axis 530. Using the Zoom 525, the user is able to navigate through the timeline by zooming in or out of the selected reference date. The Watermark 535 displays a name for the timeline, such as "Timeline," "Geologic Timeline," or "Prehistory Timeline." The View as List 540 allows the user to view some Links on a list.

The Dynamic Timeline Overview

FIG. 6 is flow diagram illustrating steps of an exemplary method for providing a Dynamic Timeline for an electronic encyclopedia with Time Periods, Tools, Scrolling, and Zooming options. In step 605, the Links are put in chronological order.

In step 610 the Dynamic Timeline introductory window is displayed. In step 615, the user can choose the Enter Timeline option. At this point, in step 620 the View object 415 gets the default settings for the dynamic settings. The View object 415 gives the Grid object 410 the dynamic settings in step 625.

In step 630, the Grid object 410 determines the center and boundary years. In step 635 the Grid object 410 gives the boundary years to the Data object 405. The Data object 405 gets all the Links that are within the boundary years in step 640. The Data object 405 sorts the Links according to priority in step 645.

In step 650, the Operating System 36 gives the Main Window 505 a paint message. A paint message arises when the Operating System 36 tells the Main Window 505 to paint the Links. The Grid object 410 determines which Links will fit on the screen and where they will fit in step 655. In step 660, the Main Window 505 paints the Links and Watermark on a top portion, such as the top ¾ths of the screen. The Time Periods 510, Tools 515, Scroll 520, Zoom 525 and Time Axis 530 are also painted.

The Dynamic Settings

Figure 7:
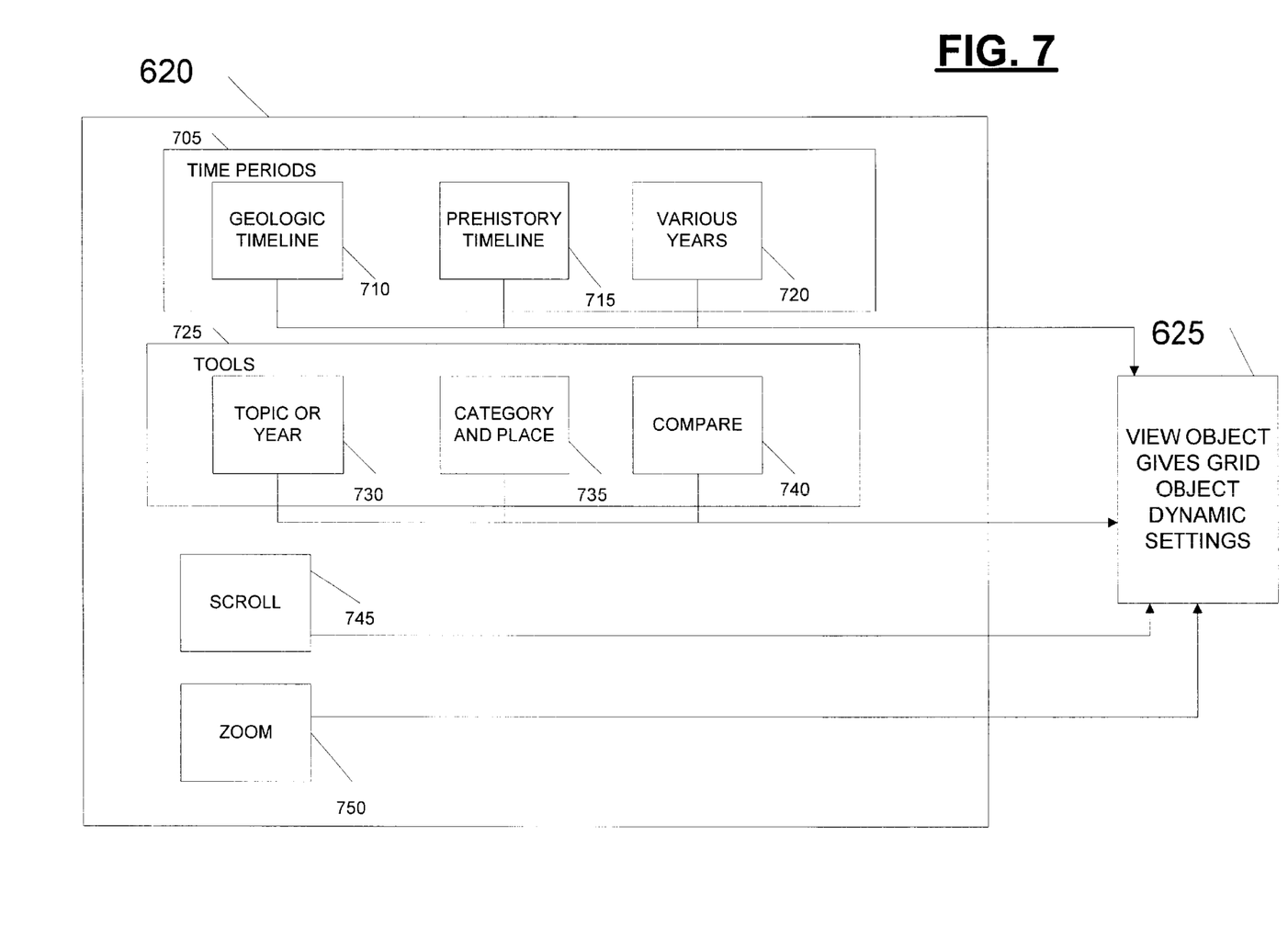
FIG. 7 is a functional block diagram illustrating exemplary dynamic feature optional settings used to determine which information to paint on a Main Window.

FIG. 7 is a functional block diagram illustrating an exemplary dynamic feature settings used to determine which information to paint on the Main Window 505. Once the default timeline has been created, the user can change the dynamic feature settings. The user will be able to view different Links by changing the setting for the Time Period 705, the Tools 725, the Scroll 745, and the Zoom 750. The Time Periods 705 allow the user to choose a Geologic Timeline 710, a Prehistory Timeline 715, and Various Years 720. The Tools 725 allows the user to choose the Topic or Year 730, the Category and Place 735, and the Compare 740. Once the user chooses from these options, the Data object 405 determines what information to display on the Timeline.

Referring to FIG. 7, the Time Periods 705 can include a Geologic Timeline 710, a Prehistory Timeline 715, and Various Years 720. The Geologic Timeline 710 displays Links about the earth's formation that occur between a beginning year and an end year, such as 4.6 billion and 10,000 B.C. The Geologic Timeline 710 displays Links that include dinosaur ages, the formation of land and water masses, and the "Big Boom." The Prehistory Timeline 715 displays Links that occurred before civilization was widely developed. Displayed Links include the development of animal and human species. The Prehistory Timeline 715 displays these Links between a beginning year and an end year, such as 4 million and 3,000 B.C. In addition, referring to Various Years 720, the user can jump to various years on the timeline, such as 400 B.C., 800, 1600, 1800 and 1950. Once the user chooses these options, steps 620 through 660 of FIG. 6 are repeated with this new setting information.

The Tools 725 in FIG. 7 permit a user to filter the Links that will be shown on the screen. Topic or Year 730 of the Tools 725 allows a user to enter a topic or year. If the user enters a year, steps 620 through 660 of FIG. 6 are repeated with this new setting information. If the user enters a topic, and no Links fit the description of the topic, the user will be able to choose from a list of topics. Once a recognized topic is entered, the user will see a list of events. The user can enter one of the events, or can choose to see a customized timeline of these events. Once this information is entered, steps 620 through 660 of FIG. 6 are repeated with this new setting information.

The Category and Place 735 of the Tools 725 allows a user to choose from a list of categories and places to filter the Links that will be shown on the screen. For example, the following categories could be used: Political History, Philosophy and Religion, Arts, Science and Technology, and People and Society. The following geographic places could also be used: Africa, East Asia, Europe, North America, Oceania, South America, South and Central Asia, and South West Asia. It is noted that the present invention is not limited to the categories and places described or to the context of an electronic encyclopedia. Other categories and places are not beyond the scope of the present invention. Once the user has chosen his category and/or place, steps 620 through 660 of FIG. 6 are repeated with this new setting information.

The Compare 740 of the Tools 725 permits a user to compare different filters in the same time period. The user can choose Compare 740 and enter information to run two different category and place filters. Once the user has chosen his categories and/or places, steps 620 through 660 of FIG. 6 are repeated with this new setting information. Both category and place filters will be displayed on the same screen. One filter will be displayed on the top half of the screen, and the other filter will be displayed on the bottom half An additional component of the exemplary embodiment is the ability of the user to access Topic and Year 210, Category or Place 215, and Compare 220 from the Dynamic Timeline's introductory screen of FIG. 2. After the user chooses the desired feature, steps 620 through 660 of FIG. 6 are repeated with this new setting information.

The Scroll 745 of FIG. 7 permits the user to navigate through the timeline by scrolling forward or backward on the timeline. After the user chooses the forward or backward Scroll 345 on FIG. 3, steps 620 through 660 of FIG. 6 are repeated with this new setting information.

The Zoom 750 of FIG. 7 facilitates navigation through the timeline by zooming in or out of a selected reference date. After the user selects a Zoom 330 level, steps 620 through 660 of FIG. 6 are repeated with this new setting information. As the user chooses the Zoom 330 level, the Time Axis 325 of FIG. 3 is appropriately reduced or expanded. Thus, the user can locate representations of data structures by first viewing broad bands of time and then by refining the view into narrower bands of time. The Zoom 850 provides differing views, such as 5, 10, 50 and 100 year views.

Determining Center and Boundary Years

Figure 8:
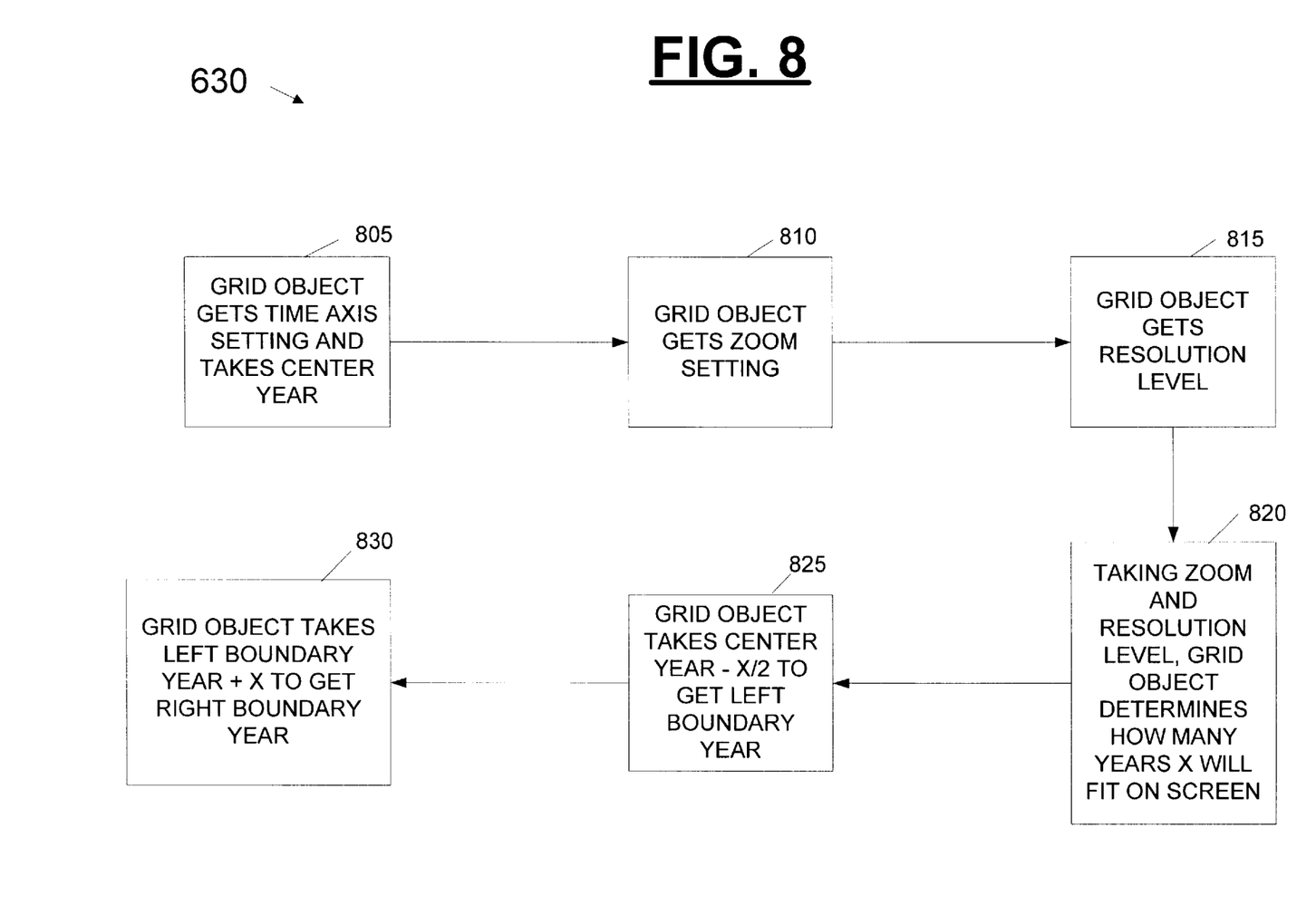
FIG. 8 is a flow diagram illustrating an exemplary method for determining the center and boundary years for the Links in the Main Window of the electronic encyclopedia.

FIG. 8 is a flow diagram illustrating step 630 of FIG. 6, which is an exemplary method for determining the center and boundary years for the Main Window 505. In step 805, the Grid object 410 gets the center year. The Grid object 410 can take the center year setting from the Time Periods 510, Tools 515, and Zoom 525, or it can recalculate the center year, such as when it uses the Scroll 520. The Grid object 410 of FIG. 4 will also get a zoom setting in step 810. This is done by using a default zoom level, or in the case where the user chooses a zoom level, by the View object 415 giving the Grid object 410 the Zoom 330 setting. The Grid object 410 also gets a default resolution level in step 815. In step 820, the Grid object 410 of FIG. 4 determines how many years X will fit on the screen by taking into account the zoom and resolution levels. The Grid object 410 then takes the center year and subtracts X/2 to get the left boundary year in step 825. In step 830, the Grid object 410 takes the left boundary year and adds X to get the right boundary year.

Determining Link Priority

Figure 9:
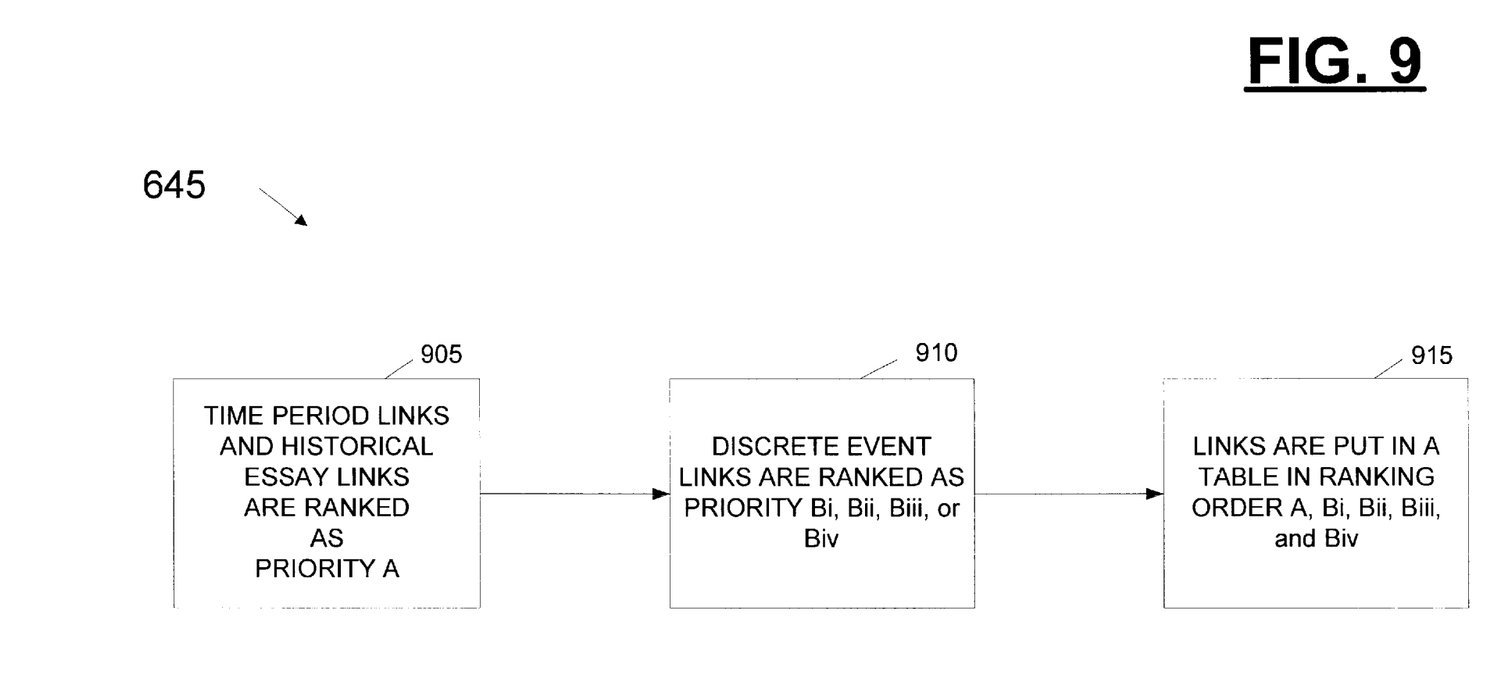
FIG. 9 is a flow diagram illustrating an exemplary method for determining the priority of Time Period Links, Historical Essay Links, and Discrete Event Links.

FIG. 9 is a flow diagram illustrating step 645 of FIG. 6, which shows an exemplary method for determining the priority of the Time Period Links 310, Historical Essay Links 315, and Discrete Event Links 305. Referring to step 905, Time Period Links 310 and Historical Essay Links 315, are given the highest priority ranking A. Referring to step 910, Discrete Event Links 305 are ranked as priority B Links and follow priority A Links. Discrete Events are additionally ranked within the Priority B ranking. This ranking is done beforehand by editors who assign a historical significance rating to each Discrete Event Link. The most historically significant Links are rated i and the least significant Links are rated iv. Thus Discrete Event Links 305 are ranked as Bi, Bii, Biii or Biv. Referring to step 915, the Links are put in a table in ranking order from the most important to least important: A, Bi, Bii, Biii, Biv.

Determining Link Placement

Figure 10:
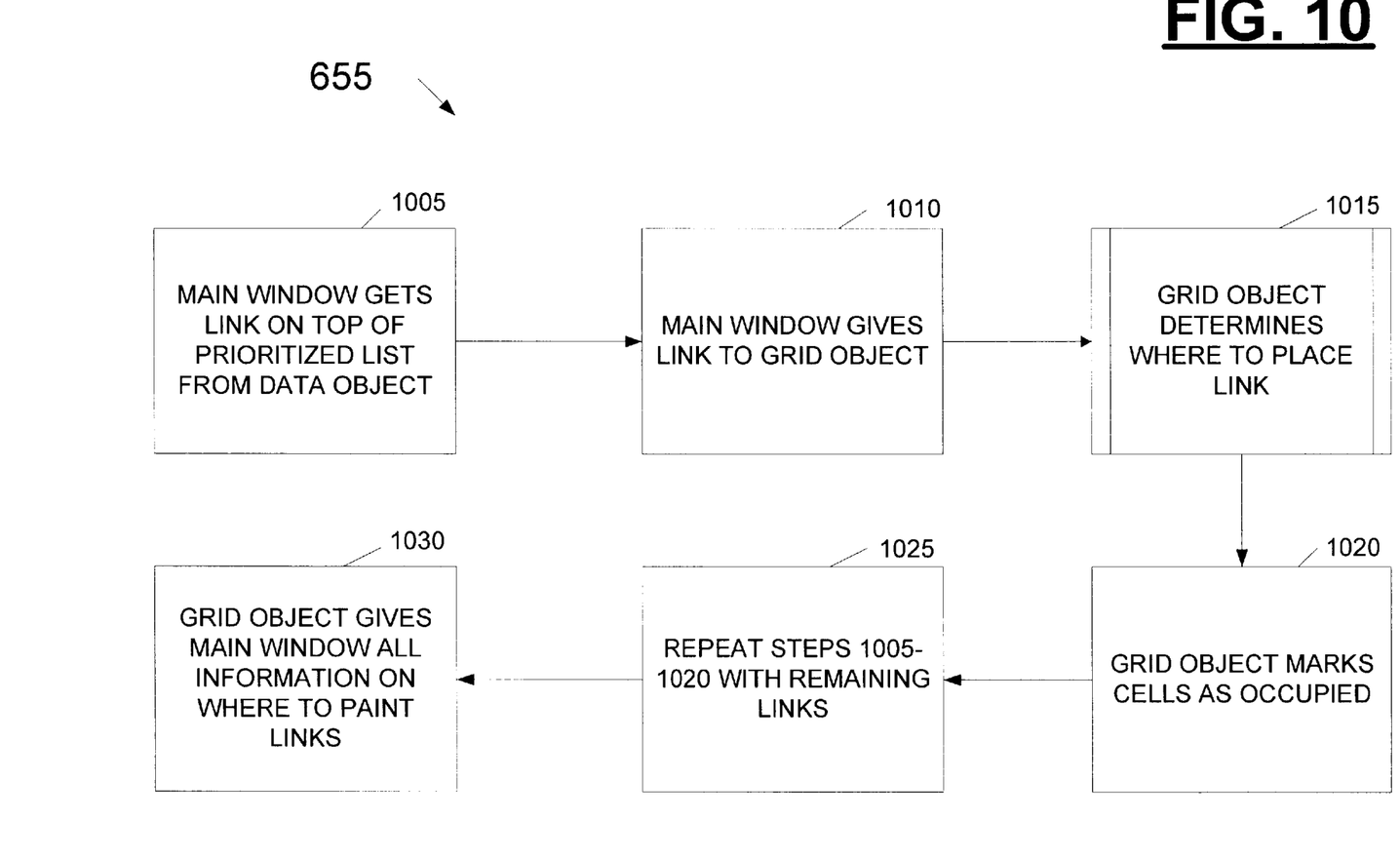
FIG. 10 is a flow diagram illustrating an exemplary method for determining which Links will fit and where they will be placed on the Main Window of the electronic encyclopedia.

FIG. 10 is a flow diagram illustrating step 655 of FIG. 6, which shows an exemplary method for determining which Links will fit and where they will be placed on the Main Window 505. In step 1005, the Main Window 505 goes to the Data object 405 and gets the Link at the top of the prioritized list. In getting the Link, the Main Window 505 also gets information on the length of the Link. In step 1010, the Main Window 505 gives the Link to the Grid Object 410. In step 1015, the Grid object 410 determines where to place the Link on the Main Window 505. The Grid object 410 then marks the corresponding amount of cells as occupied in step 1020. In step 1025, the Main Window 505 repeats steps 1005–1020 with the remaining Links in the prioritized list. If the Grid object 410 determines a Link will not fit, it will continue to try the remaining Links to see if any will fit on the screen. In step 1030, the Grid object 410 gives the Main Window 505 all the information on where to paint the Links.

Figure 11:
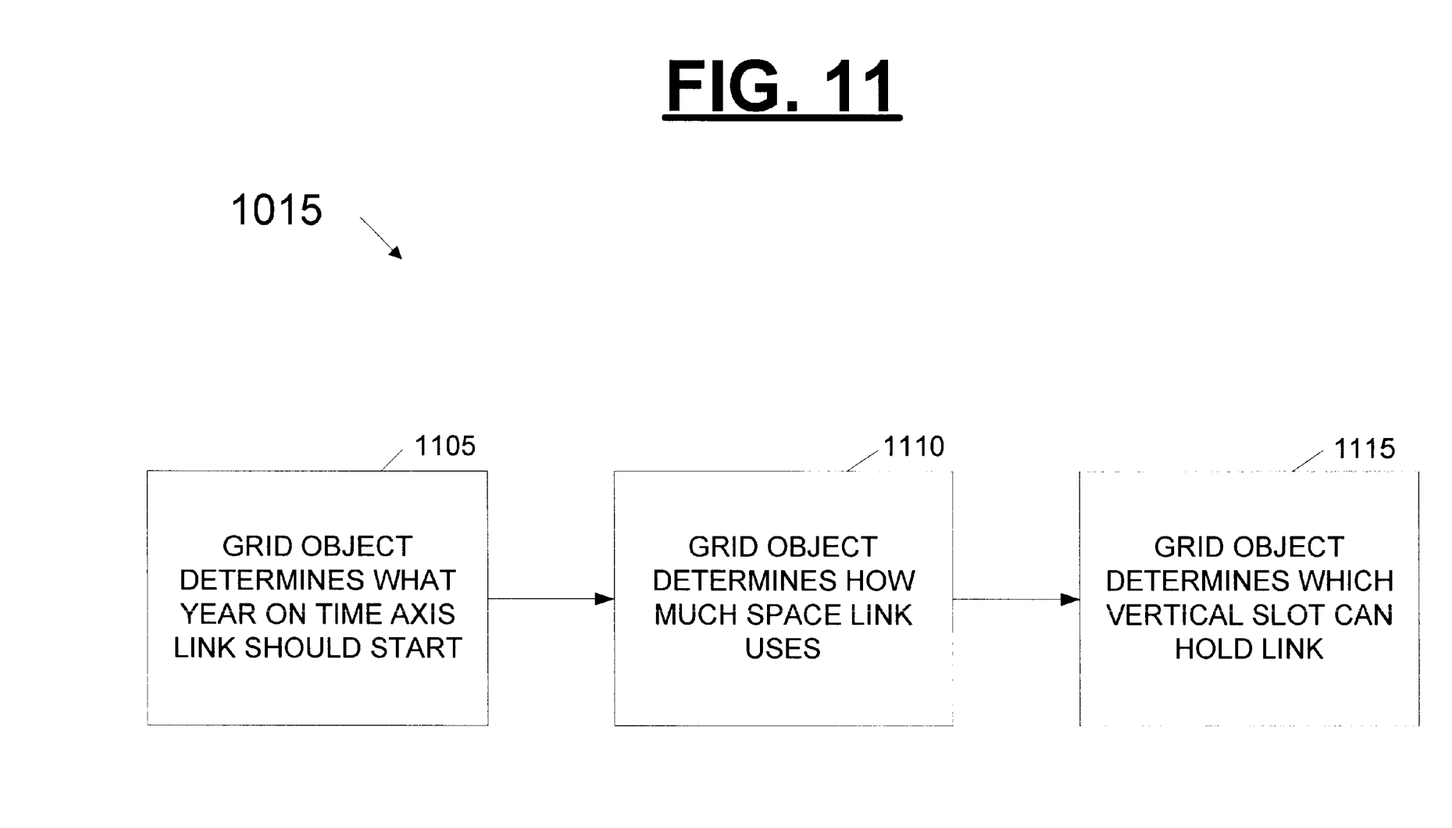
FIG. 11 is a flow diagram illustrating an exemplary method for determining where to place the Links on the Main Window.

FIG. 11 is a flow diagram illustrating step 1015 of FIG. 10, which explains an exemplary method for determining where to place the Links on the Main Window 505. In step 1105, the Grid object 410 determines what year on the Time Axis 325 the Link should begin by getting the starting year embedded within the Link. This is the x (horizontal) coordinate of the Link. Then in step 1110, the Grid object 410 determines how much space the Link uses by getting the length embedded within the Link. In step 1115, the Grid object 410 determines where vertically to place the Link. For each year there are multiple slots from the top to the bottom of the Main Window 505 open for Links. In an exemplary method, the Grid object 410 will first try to put the Link at the center of the screen. If the Link will not fit in the center, the Grid object 410 will work its way out from the center trying the slot above, and then the slot below, until it finds a slot that will hold the Link. For example, an exemplary embodiment is to have 10 slots in chronological order, with slot 1 on the bottom and slot 10 on the top. The Grid object 410 first tries the center slot 5, then 6, then 4, then 7, then 3, then 8, then 2, then 9, then 1, then 10. Placing the most important Links in the center will help the user to see the most important Links first.

CONCLUSION

The present invention has been described in relation to particular embodiments which are intended in all respects to be illustrative rather than restrictive.

Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented process for generating a dynamic timeline for a selected time period associated with time-related information, including the steps of:

determining a center year for the selected time period and a pair of boundary years that define the time interval of the selected time period;

obtaining the time-related information associated with the selected time period based on the time interval bounded by the boundary years, each time-related information associated with at least one of the years of the selected time period;

determining the portion of time-related information that can be visibly presented proximate to the timeline and within a window frame;

rendering the timeline having the center year positioned in the approximate center of the window frame and each boundary year placed at one edge of the window frame;

rendering the portion of the time-related information proximate to the timeline and within the window frame, each time-related information positioned proximate to a location on the timeline that corresponds to at least one of the years associated with the time-related information.

2. The computer-implemented process of claim 1, wherein said step of determining a center year and boundary years comprises the steps of:

defining a time axis for the timeline based on the center year and the boundary years;

determining a total number of years "x" that can be visibly displayed on the timeline and within the window frame;

calculating the boundary year to be displayed at the left edge of the window frame by subtracting the center year from "x/2"; and calculating the boundary year to be displayed at the right edge of the window frame by adding "x" to the boundary year displayed at the left edge.

3. The computer-implemented process of claim 1, further comprising the steps of identifying a presentation priority for each time-related information and rendering the portion of the time-related information proximate to the timeline and within the window frame based on the presentation priority assigned to the time-related information.

4. The computer-implemented process of claim 3, wherein the step of identifying the presentation priority of the time-related information step comprises ranking the information according to historical importance and ordering the information within a priority list based on the assigned ranking.

5. The computer-implemented process of claim 4, wherein the step of determining the portion of time-related information that can be visibly presented proximate to the timeline and within the window frame comprises the steps of:

(a) locating the information having the highest ranking in the priority list;

(b) identifying the location proximate to the timeline for placing the information;

(c) allocating an amount of space within the window frame that will be occupied by the information; and repeating steps (a)–(c) for the information having the next highest ranking in the priority list until the information for the selected time period has been exhausted.

6. The computer-implemented process of claim 4, wherein the step of determining the portion of time-related information that can be visibly presented proximate to the timeline and within the window frame comprises the steps of:

(a) locating the information having the highest ranking in the priority list;

(b) identifying the horizontal and vertical locations proximate to the timeline for placing the information;

(c) allocating an amount of horizontal and vertical space within the window frame that will be occupied by the information; and repeating steps (a)–(c) for the information having the next highest ranking in the priority list until the information for the selected time period has been exhausted.

7. The computer-implemented process of claim 6, wherein the step of identifying the horizontal location comprises determining at least one of the years associated with the time-related information.

8. The computer-implemented process of claim 6, wherein the step of identifying the vertical location proximate to the time line comprises the steps of:

creating multiple vertical slots extending across the vertical edges of the window frame and from the top edge of the window frame to the bottom edge of the window frame;

attempting to place the time-related information in a center vertical slot; and if the center vertical slot is already allocated for use by other time-related information, then placing the information in one of the available vertical slots above or below the center vertical slot.

* * * * *